United States Patent [19]

McKaveney

[11] 4,024,322

[45] May 17, 1977

[54] BATTERY WITH SILICON METAL ANODES

[75] Inventor: James P. McKaveney, Claremont, Calif.

[73] Assignee: Hooker Chemicals & Plastics Corporation, Niagara Falls, N.Y.

[22] Filed: Mar. 24, 1975

[21] Appl. No.: 561,144

[52] U.S. Cl. .............................. 429/201; 429/218
[51] Int. Cl.$^2$ .......................................... H01M 6/04
[58] Field of Search ............ 136/20, 120 R, 100 R, 136/100 M; 75/134 S, 134 A, 134 N, 152, 168 R; 204/254–256, 268; 429/218, 199–201

[56] References Cited

UNITED STATES PATENTS

| | | | |
|---|---|---|---|
| 2,266,122 | 12/1941 | Kinsel | 75/134 S |
| 3,137,642 | 6/1964 | Johns | 204/148 |
| 3,272,623 | 9/1966 | Crafts et al. | 75/134 S |
| 3,297,487 | 1/1967 | Pomeroy et al. | 136/86 |
| 3,301,711 | 1/1967 | King, Jr. et al. | 136/120 |
| 3,324,025 | 6/1967 | Hackerman et al. | 204/292 |
| 3,346,421 | 10/1967 | Thompson et al. | 136/120 |
| 3,380,856 | 4/1968 | Pohl | 136/120 |
| 3,383,202 | 5/1968 | Lynch | 75/134 S |
| 3,479,230 | 11/1969 | Roberts | 75/134 S |
| 3,717,456 | 2/1973 | Percheron et al. | 75/134 S |
| 3,734,714 | 5/1973 | Kozak et al. | 75/134 A |
| 3,762,914 | 10/1973 | Voloschenko | 75/134 S |
| 3,765,875 | 10/1973 | Septier et al. | 75/134 S |
| 3,926,770 | 12/1975 | Hoekje | 204/256 |
| 3,969,139 | 7/1976 | Lai | 136/6 LN |

*Primary Examiner*—C. F. LeFevour
*Attorney, Agent, or Firm*—Peter F. Casella; Howard M. Ellis

[57] ABSTRACT

Anodes which exhibit electrochemical potentials comparable to zinc are prepared from alloys formed from silicon together with one or more highly reactive elements which are unstable when introduced alone into water. The highly active element component of the alloy is preferably selected from the group consisting of calcium, barium, magnesium, cerium and strontium. Preferably, the active element or elements comprise from about 5 to about 65 percent of the alloy.

7 Claims, No Drawings

BATTERY WITH SILICON METAL ANODES

Battery anodes used in batteries having aqueous electrolytes are normally formed from zinc or zinc alloys.

Certain other metals, such as the alkali and alkaline earth metals, while desirable as anodes due to the high electro-chemical potentials, are unstable in the presence of water, thus demanding costly and careful handling, and the use of non-aqueous electrolytes, as for example, nitromethane, propylene carbonate, tetrahydrofuran, acetonitrile, and the like.

Anodes which exhibit electrochemical potentials as high as or higher than zinc without the instability associated with the more highly active metals would be highly desirable.

It is the primary object of the present invention to provide improved anodes which are stable in the presence of water, and which exhibit electrochemical potentials as high as or higher than zinc.

It is another object of the present invention to provide improved batteries containing such anodes.

It is a further object of the present invention to provide a battery comprising an anode, a cathode, and an electrolyte capable of electrochemically reacting with the anode and cathode to generate current.

Other objects of the present invention will become apparent to those skilled in the art upon reading the detailed description of the invention.

In accordance with the present invention, anodes are prepared from alloys of a highly active metal, which alone exhibits instability in water, and silicon.

The silicon serves to lower the electro-chemical potential of the highly active metal sufficiently to impart stability in water; however, the electrochemical potential of the composite exhibited is as high as or higher than that of zinc. Desirably, the anode contains from about 5 to about 65 percent of the highly active metal, based upon the weight of the anode, with the remainder of the anode being comprised of silicon. Amounts of other metals which do not adversely affect the utility of the anode may also be present, as for example, iron, aluminum, carbon, titanium, molybdenum, vanadium, chromium, nickel or the like.

The highly active metals which have been found to be suitable are calcium, barium, magnesium, cerium, strontium, lanthanum, lithium and manganese, or mixtures thereof. Preferably calcium or magnesium are employed as the active metal component of the anode.

In the practice of the present invention, silicon-active metal alloys are reduced to a particle size of from about 2000 to about 44 microns, and preferably from about 800 to about 150 microns. The powdered alloys are then shaped into the configuration of the desired anode by any suitable means known to the art, as for example, placing the powdered alloy in a graphite mold and subjecting the powder to sintering, under an inert atmosphere or vacuum as needed. The silicon-active metal alloys may also be formed into anodes by adhering the alloy powder to a suitably conductive base, as for example, graphite.

The formation of the silicon-active metal alloy is conveniently effected by carbon reduction of the active metal oxide such as lime (CaO) with silica ($SiO_2$) in the submerged-arc electric furnace typical of the ferro-alloy industry. Other means, known to those skilled in the art, may be used, such as vacuum melting with induction heating of the pure elemental forms in the desired compositional ranges.

Following preparation of the anodes, surface oxide films are removed, if present, by briefly immersing the anode in a dilute mineral acid solution, e.g., 1:10 hydrochloric acid. In the instance of the more highly active alloys, such immersion cleaning should not exceed about 10 seconds due to the high reactivity of these alloys. With the lesser active alloys, such as ferromanganese, an immersion time of from about 30 seconds to about 2 minutes may be used.

As stated, the silicon-active metal alloys used in the formation of the anodes of the present invention are comprised of silicon, and an active metal which has a high electrochemical oxidation potential, on the order of from about +1.00 to about +3.00 volts (hydrogen scale) and which exhibits instability when introduced alone into water. The remainder of the alloys, if any, may be comprised of minor amounts of other metals, such as iron, carbon, chromium, phosphorus, sulfur, or titanium and the like. Preferably the silicon component is present, in weight percent based on the weight of the alloy in an amount ranging from about 1 to about 65 percent. Particularly useful are the higher ranges from about 50 to about 65 percent and aptly suited to use is a range of from about 60 to about 65 percent. Preferably the active metal is present, in weight percent based upon the weight of the alloy in an amount ranging from about 1 to about 85 percent. Particularly useful are the ranges of from about 20 to about 60 percent and aptly suited to use is a range of from about 30 to 50 percent.

Preferably, the highly active metal is selected from the group consisting of calcium, barium, magnesium, cerium, lanthanum, manganese and strontium. Other suitable metals include lithium, sodium and potassium. Suitable mixtures of the active metals may also be employed.

Because of their stability, the anodes formed in accordance with present disclosure may be used in such applications as battery anodes or cathodic protection.

A number of dilute solutions may be employed as electrolytes in the present systems, including solutions of calcium chloride, magnesium sulfate, ammonium chloride, sodium chloride, potassium tartrate and the like. Preferably, these solutions will have a concentration of from about 0.01 to about 2.0 normal, and preferably from about 0.10 to about 0.50 normal. The aqueous electrolytes normally should not have a pH below about 4 in order to avoid excessive anode corrosion. Additional disadvantages may occur if the pH is reduced to below about 2.5, since there exists the possibility of silane as well as hydrogen formation which could lead to the formation of explosive mixtures with air. Preferably, the pH of the electrolyte is maintained at from about 4 to about 11.

When the anodes are employed in batteries, conventional cathodes are utilized, such as those formed, for example, from oxides of lead, manganese, nickel, copper, or the like.

The following examples serve to illustrate the present invention.

EXAMPLE 1

An alloy of calcium and silicon containing 32.4 calcium, 63.1 silicon, 4.1 iron and 0.4 barium percent by weight was crushed to a powder having an average size of about 600 microns. A layer of the powdered alloy as coated onto a graphite rod painted with silver epoxy paste. The electrode was placed in a drying oven at 160° C. for 15 hours to effect curing of the epoxy.

Following the curing period, the anode was cooled and placed in a dilute hydrochloric acid solution for a light pickle to remove any surface oxide films. Following the acid pickle, the anode was immediately water rinsed, and while still wet, attached to a copper wire at the graphite end, with the alloy-coated end placed in a beaker of test electrolyte. The opposing end of the copper was attached to a Beckman terminal connector inserted in the connection normally used for the glass electrode of a pH meter. The anode was measured in various electrolytes compared with iron and zinc, with the results shown on Table 1.

Table 1

| | Potentials vs. Standard Calomel Electrode | | |
|---|---|---|---|
| | | Electrolyte | |
| Alloy | 0.10N $CaCl_2$ | 0.10N $MgSO_4$ | 0.10 N $NH_4Cl$ |
| $CaSi_2$ | −1.35 | −1.20 | −1.40 |
| Zn | −0.98 | −0.99 | −1.07 |
| Fe | | −0.65 | |

EXAMPLE 2

Experiments essentially duplicating that of Example 1 were conducted utilizing the alloys set forth in Table 2. The electrochemical potentials for each compared with those of iron and zinc are set forth in Table 2.

Table 2

| | Potentials vs. Standard Calomel Electrode | | |
|---|---|---|---|
| | | Electrolyte | |
| Alloy | 0.10N $CaCl_2$ | 0.10N $MgSO_4$ | 0.10N $NH_4Cl$ |
| CaSiBa | −0.65 | −0.68 | −0.63 |
| $Mg_2Si$ | −1.25 | −1.15 | −1.21 |
| MgFeSi | −0.89 | −1.07 | −1.12 |
| Zn | −0.98 | −0.99 | −1.07 |
| Fe | — | −0.65 | — |

It will be apparent to one skilled in the art that modifications and variations of the preceding disclosure may be made without departing from the spirit and scope of the present invention.

What is claimed is:

1. In a battery comprised of an anode, a cathode and an electrolyte capable of electrochemically reacting with the anode and cathode to generate current, the improvement wherein the anode comprises an alloy having from about 1 to about 65 percent silicon by weight of alloy, and from about 1 to about 85 percent by weight of alloy, of a highly active metal selected from the group consisting of barium, magnesium, calcium, cerium, lanthanum, strontium, and mixtures thereof.

2. The battery of claim 1 wherein the active metal is present in the alloy in an amount of from about 5 to about 65 percent based upon the weight of the alloy.

3. The battery of claim 4 wherein the electrolyte is an aqueous electrolyte.

4. The battery of claim 1 wherein the alloy of silicon has the following composition in weight percent: calcium, from about 30 to about 34%; silicon, from about 60 to about 65%; iron, from about 1.5 to about 4.0% and barium about 0.4%.

5. The battery of claim 1 wherein the alloy comprises from about 50 to about 65 percent silicon by weight of alloy and from about 30 to about 50 percent calcium by weight of alloy.

6. The battery of claim 1 wherein the alloy comprises from about fifty to about sixty-five percent silicon by weight of alloy and from about 30 to about 50 percent magnesium by weight of alloy.

7. The battery of claim 3 wherein the aqueous electrolyte is selected from the group consisting of ammonium chloride, calcium chloride, and magnesium sulfate, sodium chloride and potassium tartrate.

* * * * *